(12) United States Patent
Bishop et al.

(10) Patent No.: US 10,387,154 B2
(45) Date of Patent: Aug. 20, 2019

(54) THREAD MIGRATION USING A MICROCODE ENGINE OF A MULTI-SLICE PROCESSOR

(71) Applicant: International Business Machines Corporation, Armonk, NY (US)

(72) Inventors: James W. Bishop, Newark Valley, NY (US); Marcy E. Byers, Rochester, MN (US); Steven R. Carlough, Poughkeepsie, NY (US); Paul M. Kennedy, Austin, TX (US); Albert J. Van Norstrand, Jr., Round Rock, TX (US); Phillip G. Williams, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 15/069,581

(22) Filed: Mar. 14, 2016

(65) Prior Publication Data
US 2017/0262281 A1    Sep. 14, 2017

(51) Int. Cl.
*G06F 9/30* (2018.01)
*G06F 9/38* (2018.01)
*G06F 13/40* (2006.01)
*G06F 13/42* (2006.01)

(52) U.S. Cl.
CPC .......... *G06F 9/3009* (2013.01); *G06F 9/3016* (2013.01); *G06F 9/30032* (2013.01); *G06F 9/3836* (2013.01); *G06F 13/4068* (2013.01); *G06F 13/4282* (2013.01); *G06F 2213/0042* (2013.01)

(58) Field of Classification Search
CPC .. G06F 9/30032; G06F 9/3009; G06F 9/3851; G06F 9/3885; G06F 9/3891
See application file for complete search history.

(56) References Cited

U.S. PATENT DOCUMENTS

| | | |
|---|---|---|
| 4,713,750 A | 12/1987 | Damouny et al. |
| 5,781,750 A | 7/1998 | Blomgren et al. |
| 5,822,602 A | 10/1998 | Thusoo |
| 6,209,082 B1 | 3/2001 | Col et al. |

(Continued)

OTHER PUBLICATIONS

Myong Hyon Cho; Keun Sup Shim; Lis, M.; Khan, O.; Devadas, S. "Deadlock-free fine-grained thread migration" Fifth IEEE/ACM International Symposium on Networks-on-Chip (NoCS)'11; May 1-4, 2011 (Year: 2011).*

(Continued)

*Primary Examiner* — Jacob Petranek
(74) *Attorney, Agent, or Firm* — Jason H. Sosa (57) ABSTRACT

Methods and apparatus for thread migration using a microcode engine of a multi-slice processor including issuing a thread migration instruction to the microcode engine of a decode unit, the thread migration instruction comprising an indication that the thread migration instruction is to be processed by the microcode engine; decoding, by the microcode engine, the thread migration instruction into a plurality of internal operations each targeting a different register entry; transmitting the plurality of internal operations to a dispatcher of the multi-slice processor; and manipulating, by the multi-slice processor, a plurality of register entries according to the plurality of internal operations.

20 Claims, 7 Drawing Sheets

(56) References Cited

U.S. PATENT DOCUMENTS

| | | | |
|---|---|---|---|
| 8,055,886 B2 | 11/2011 | Tashiro et al. | |
| 2014/0026146 A1* | 1/2014 | Jahagirdar | G06F 9/4856 |
| | | | 718/105 |
| 2014/0181830 A1* | 6/2014 | Naik | G06F 9/461 |
| | | | 718/104 |
| 2015/0127927 A1* | 5/2015 | Paddon | G06F 9/30043 |
| | | | 712/225 |
| 2015/0324206 A1* | 11/2015 | Eisen | G06F 9/38 |
| | | | 712/215 |
| 2016/0283245 A1* | 9/2016 | Ben-Kiki | G06F 9/3822 |
| 2017/0220346 A1* | 8/2017 | Beckmann | G06F 9/3001 |

OTHER PUBLICATIONS

Keun Sup Shim; Lis, Mieszko; Khan, Omer; Devadas, Srinivas. "Thread Migration Prediction for Distributed Shared Caches" IEEE Computer Architecture Letters13.1: 53-6. IEEE. (Jan. 2014) (Year: 2014).*

Mikhail Dorojevets and Dmitri Strukov. "Memory Latency Reduction with Fine-grain Migrating Threads in NUMA Shared-memory Multiprocessors" Proceedings of the 14th IASTED International Conference Parallel and Distributed Computing and Systems: 767-72;vi+860. Acta Press. (2002) (Year: 2002).*

\* cited by examiner

THREAD MIGRATION USING A MICROCODE ENGINE OF A MULTI-SLICE PROCESSOR

BACKGROUND

Field of the Invention

The field of the invention is data processing, or, more specifically, methods, apparatus, and products for thread migration using a microcode engine of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for thread migration using a microcode engine of a multi-slice processor are disclosed in this application. Thread migration using a microcode engine of a multi-slice processor includes issuing a thread migration instruction to the microcode engine of a decode unit, wherein the thread migration instruction comprises an indication that the thread migration instruction is to be processed by the microcode engine; decoding, by the microcode engine, the thread migration instruction into a plurality of internal operations each targeting a different register entry; transmitting the plurality of internal operations to a dispatcher of the multi-slice processor; and manipulating, by the multi-slice processor, a plurality of register entries according to the plurality of internal operations.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
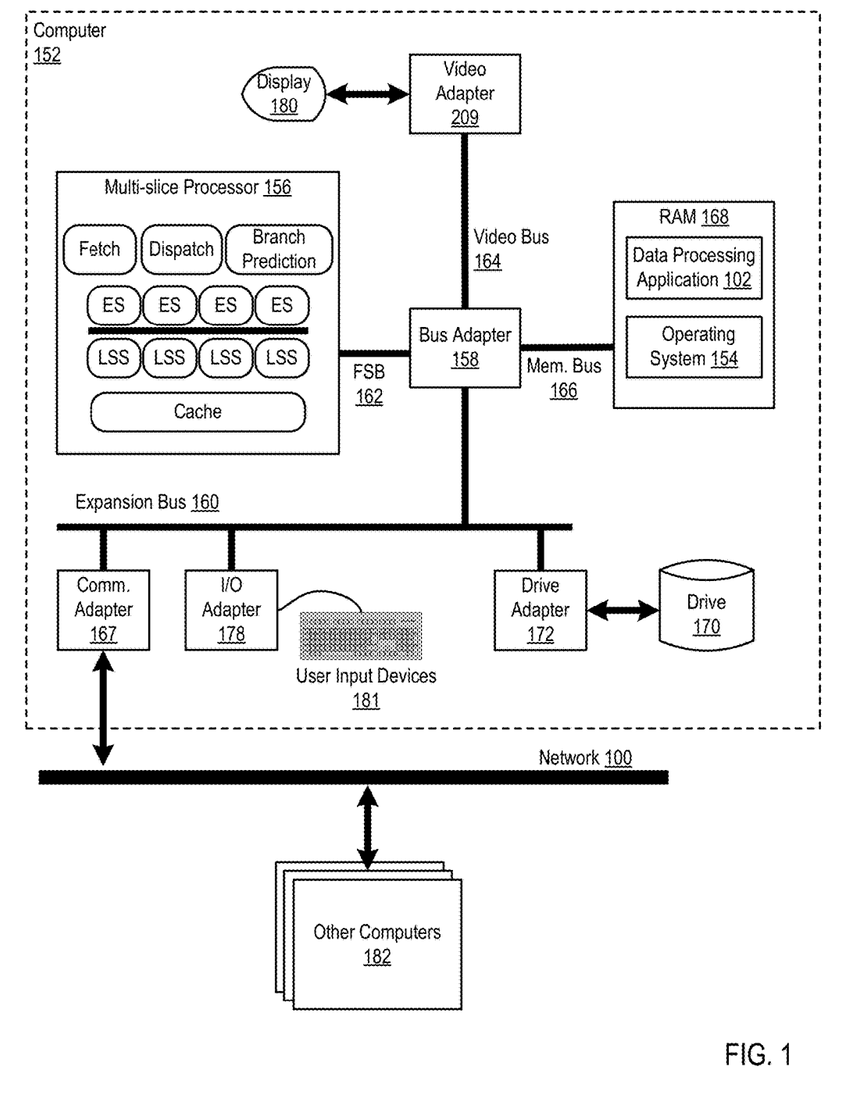
FIG. 1 sets forth an example system configured for thread migration using a microcode engine of a multi-slice processor.

Exemplary methods, apparatus, and products for thread migration using a microcode engine of a multi-slice processor in accordance with the present invention are described with reference to the accompanying drawings, beginning with FIG. 1. FIG. 1 sets forth a network diagram of a system configured for thread migration using a microcode engine of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, a general purpose register (GPR), a history buffer, an arithmetic logic unit (212) (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
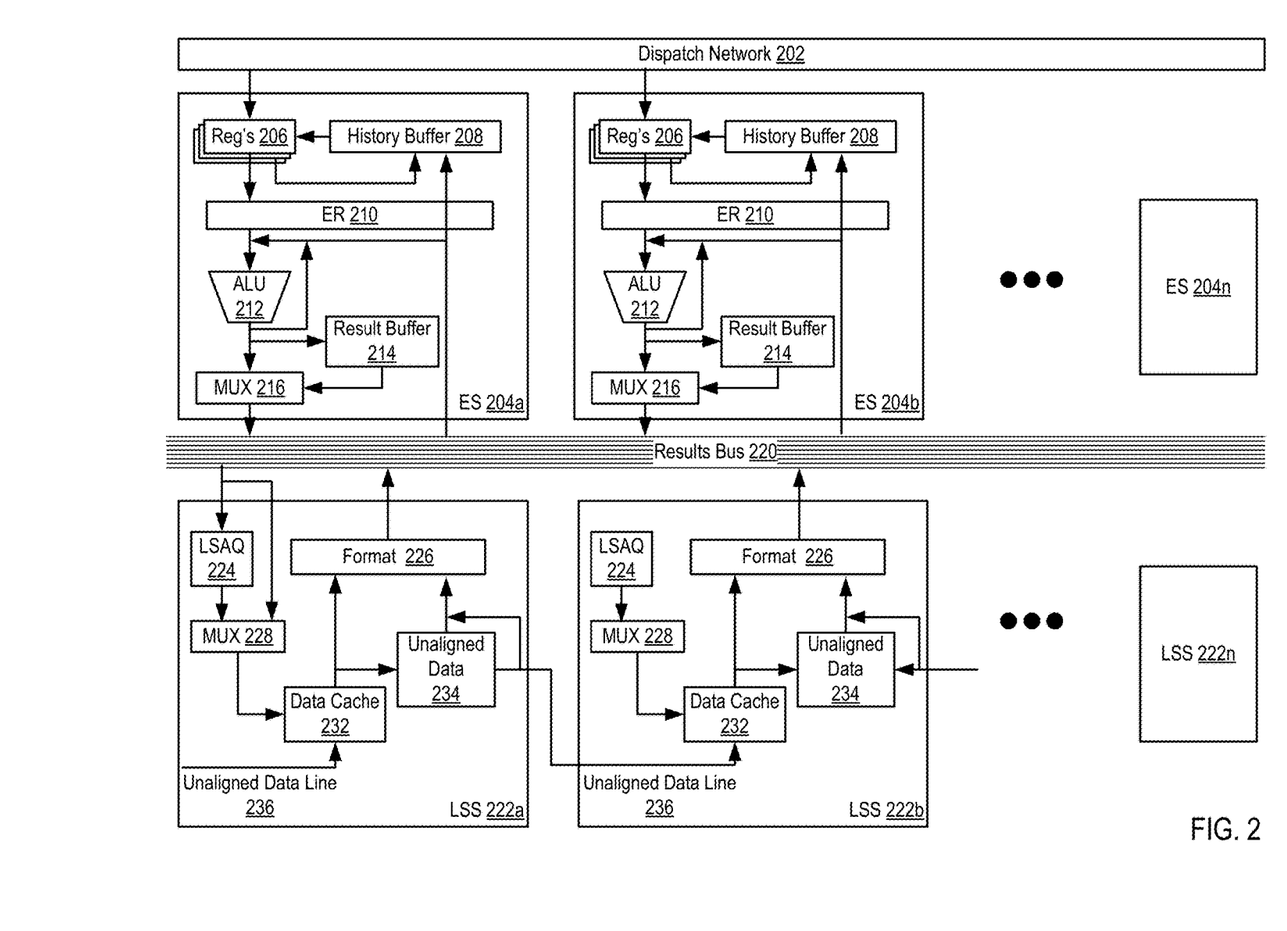
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes a general purpose register (GPR) (206) and a history buffer (208). The general purpose register and history buffer may sometimes be referred to as the mapping facility, as the registers are utilized for register renaming and support logical registers.

The general purpose register (206) is configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a-222n) via the results bus (220).

The arithmetic logic unit depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus may be configured in a variety of manners and be composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

Figure 3:
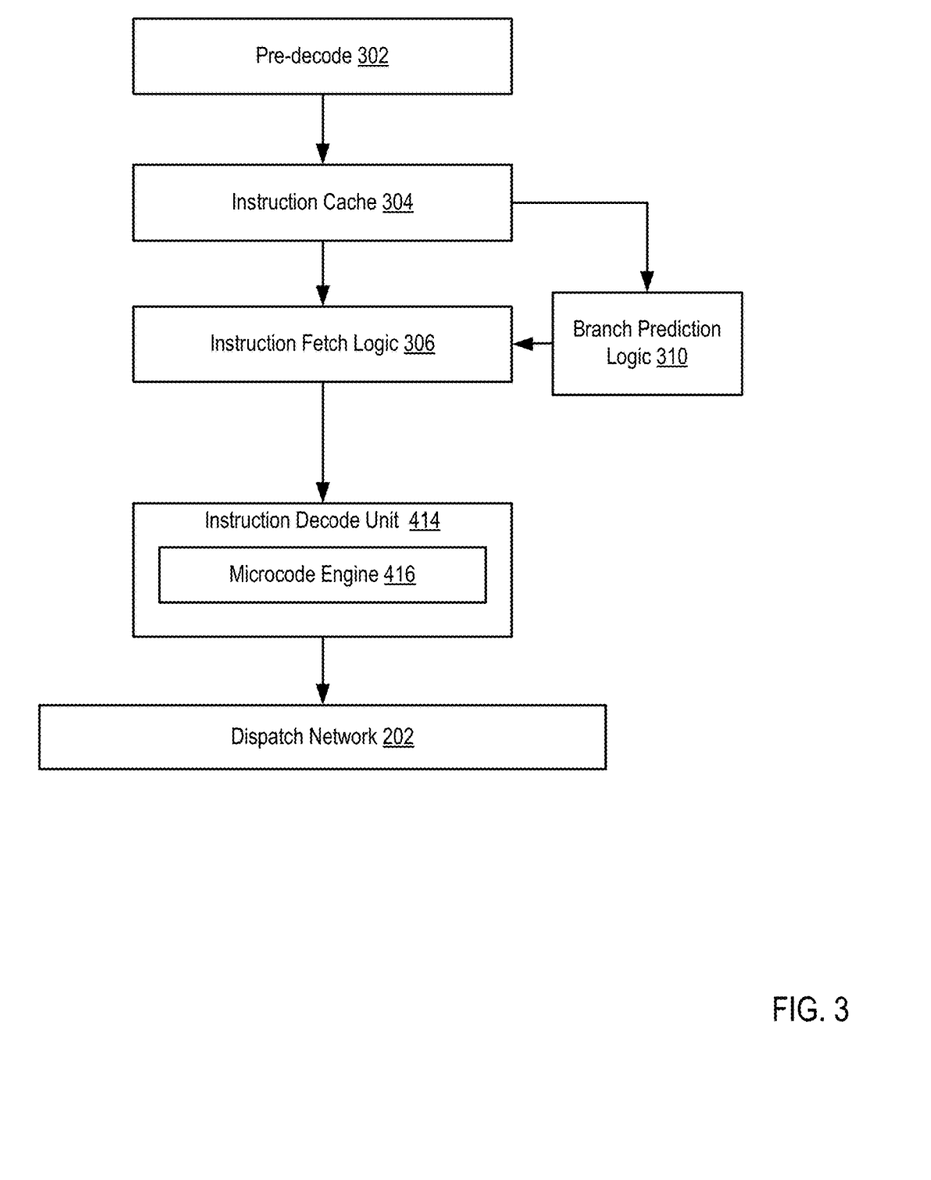
FIG. 3 sets forth a block diagram of another portion of a multi-slice processor according to embodiments of the present invention.

For further explanation, FIG. 3 sets forth a block diagram of another portion of a multi-slice processor according to embodiments of the present invention. The example multi-slice processor of FIG. 3 includes pre-decode logic (302) configured to retrieve instructions from memory, perform a preliminary decode of the instruction and store the pre-decoded instruction into an instruction cache (304).

The example multi-slice processor of FIG. 3 also includes branch prediction logic (310). Branch prediction logic generally performs branch prediction for pre-decoded instructions and tracks various branch prediction statistics for executing and executed instructions. The branch prediction logic (310) may include or access various registers and storage that contain such branch prediction statistics. Examples of storage entities may include global branch history tables and the like.

The example multi-slice processor of FIG. 3 also includes an instruction fetch unit (306). An instruction fetch unit (306) generally retrieves instructions from the instruction cache and provides the fetched instruction to instruction decode logic (308).

The example instruction decode unit (414) of FIG. 3 performs a final decode operation on the fetched instructions and provides the decoded instructions to the dispatch network (202). The example instruction decode unit (414) of FIG. 3 also includes a microcode engine (416). The microcode engine generally performs a portion of decoding an instruction in which machine code is translated into hardware-level instructions. Additionally, as described below in greater detail, the example microcode engine of FIG. 3 may also assist in the performance of thread migration in the multi-slice processor. The dispatch network as described above, dispatches the decoded instructions among slices.

Figure 4:
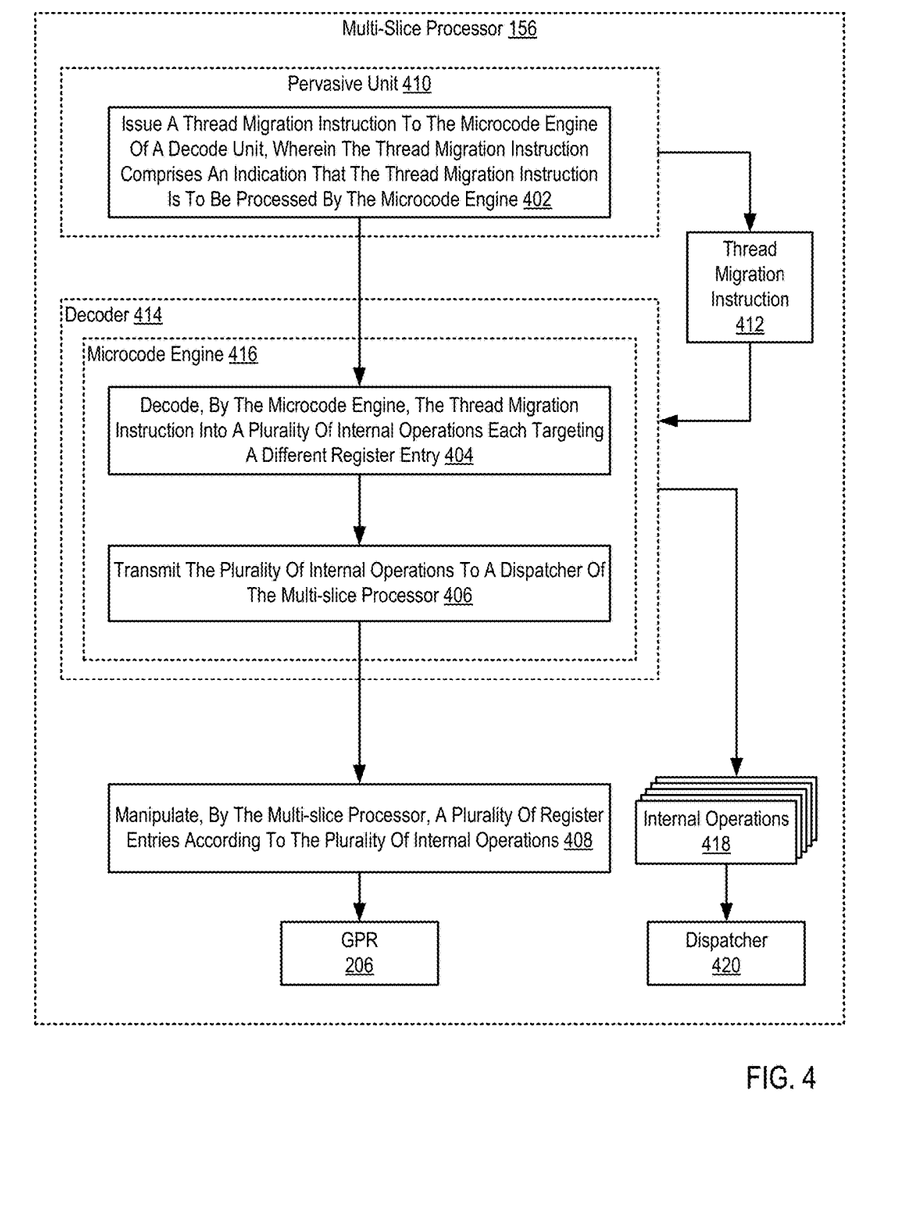
FIG. 4 sets forth a flow chart illustrating an example method of thread migration using a microcode engine of a multi-slice processor.

For further explanation, FIG. 4 sets forth a flow chart illustrating an exemplary method for thread migration using a microcode engine of a multi-slice processor according to embodiments of the present invention. The method of FIG. 4 includes issuing (402) a thread migration instruction to the microcode engine (416) of a decode unit. The thread migration instruction (412) may include an indication that the thread migration instruction is to be processed by the microcode engine (416). Issuing (402) a thread migration instruction (412) to the microcode engine (416) of a decode unit may be carried out by generating the thread migration instruction and inserting the thread migration instruction into the instruction queue of an execution slice of the multi-slice processor.

The thread migration instruction (412) may be issued as part of a procedure to move a thread from one execution slice to another, referred to here as a 'target execution slice.' In that case, the data stored in registers dedicated to the thread subject to be migrated are also moved to registers for the target execution slice. Once the data is moved to the new registers, execution of the thread may then be restarted on the target execution slice. The thread migration instruction (412) may not identify the target execution slice. Instead, the pervasive unit may use a wire on the multi-slice processor to identify the target execution slice for the procedure.

The thread migration instruction (412) may include an operation and a range of GPR (206) entries to be manipulated according to the operation by the multi-slice processor. Specifically, the thread migration instruction (412) may include a starting GPR entry and an ending GPR entry. The operation may specify the manner in which each GPR entry is to be manipulated. For example, the operation may instruct the multi-slice processor to move, copy, delete, etc., the data in each register entry within the given range. The thread migration instruction (412) may further identify the source execution slice of the thread to be migrated.

The indication within the thread migration instruction (412) may be a portion of the thread migration instruction that signals to a pre-decode unit in the decoder that the instruction is to be directed to the microcode engine (416). The indication may be a series of bits attached to the thread migration instruction that include pre-decode information. Alternatively, the indication may be sent separately from the instruction. For example, the indication could be a signal sent to the core in order to prepare the core for receiving the instruction.

The thread migration instruction may be issued by a pervasive unit (410). A pervasive unit (410), as the term is used in this specification, refers to an element of a multi-slice processor capable of generating and issuing thread migration instructions to a decoder (414). The pervasive unit (410) may be a support processor for a core of the multi-slice processor. The pervasive unit (410) may include functionality to insert instructions, such as thread migration instructions, into the instruction queue of a core. The pervasive unit (410) may further include functionality to manage functions of a core of the multi-slice processor, such as quiescing the core.

The pervasive unit (410) may issue the thread migration instruction using a ramming procedure. The ramming procedure may include quiescing the core and signaling to the core that the incoming instruction is to be processed by the microcode engine (416). Such signaling may be performed, for example, using one or more wires on the core for signaling the core to receive rammed instructions.

FIG. 4 also includes decoding (404), by the microcode engine (416), the thread migration instruction into a plurality of internal operations (418) each targeting a different register entry. Decoding (404), by the microcode engine (416), the thread migration instruction into a plurality of internal operations (418) each targeting a different register entry may be carried out by iterating over the thread migration instruction (412) and generating an internal operation for each GPR entry in a range of entries presented in the thread migration instruction (412). Each internal operation may be part of the microarchitecture of the multi-slice processor. Specifically, an internal operation may be an instruction used by elements within the multi-slice processor to communicate with other elements within the multi-slice processor.

For example, the thread migration instruction (412) may include a 'move' operation and a GPR range of '0-41'. The microcode engine (416) may then generate 42 internal operations to move data, one for each entry from 0 through 41. Accordingly, the microcode engine (416) may decode the thread migration instruction in such a way as to allow a single thread migration instruction to be used to manipulate more GPR entries per number of cycles than issuing one internal instruction at a time.

FIG. 4 also includes transmitting (406) the plurality of internal operations (418) to a dispatcher (420) of the multi-slice processor. Transmitting (406) the plurality of internal operations (418) to a dispatcher (420) of the multi-slice processor may be carried out by sending each of the internal operations (418) to a dispatcher (420) for processing by other elements of the multi-slice processor.

FIG. 4 also includes manipulating (408), by the multi-slice processor, a plurality of register entries (206) according to the plurality of internal operations (418). Manipulating (408), by the multi-slice processor, a plurality of register entries according to the plurality of internal operations (418) may be carried out by moving, copying, deleting, or otherwise manipulating the entry data according to each internal operation transmitted from the decoder (414). The GPR (206) entries may include both general purpose registry entries and vector registries.

Manipulating (408), by the multi-slice processor, a plurality of register entries (206) according to the plurality of internal operations (418) may be carried out by one or more elements within the multi-slice processor. For example, the internal operations (418) may be issued to a vector scaler unit and an issue unit may provide the source data. The vector scaler unit may put the data on a write-back bus, and the issue unit may write the data to the register entries. Alternatively, the GPRs may be moved by the fixed-point unit and the vector registers may be moved by the vector unit.

Figure 5:
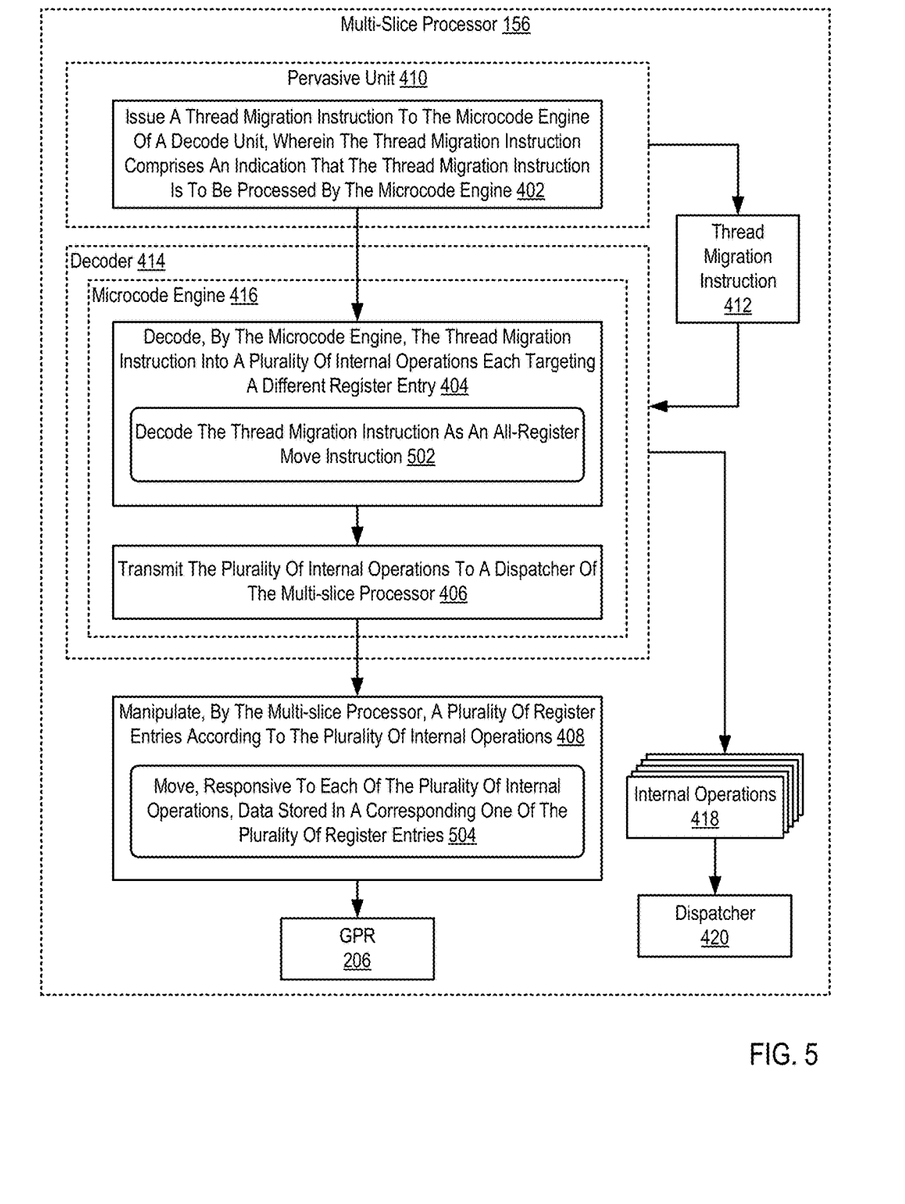
FIG. 5 sets forth a flow chart illustrating another example method of thread migration using a microcode engine of a multi-slice processor.

For further explanation, FIG. 5 sets forth a flow chart illustrating a further exemplary method for thread migration using a microcode engine of a multi-slice processor according to embodiments of the present invention that includes issuing (402) a thread migration instruction to the microcode engine (416) of a decode unit, wherein the thread migration instruction comprises an indication that the thread migration instruction is to be processed by the microcode engine (416); decoding (404), by the microcode engine (416), the thread migration instruction into a plurality of internal operations each targeting a different register entry; transmitting (406) the plurality of internal operations to a dispatcher of the multi-slice processor; and manipulating (408), by the multi-slice processor, a plurality of register entries according to the plurality of internal operations.

The method of FIG. 5 differs from the method of FIG. 4, however, in that the decoding (404), by the microcode engine (416), the thread migration instruction into a plurality of internal operations each targeting a different register entry of FIG. 5 includes decoding (502) the thread migration instruction as an all-register move instruction. The method of FIG. 5 also differs from the method of FIG. 4 in that the manipulating (408), by the multi-slice processor, a plurality of register entries according to the plurality of internal operations includes moving (504), responsive to each of the plurality of internal operations, data stored in a corresponding one of the plurality of register entries.

Decoding (502) the thread migration instruction as an all-register move instruction may be carried out by generating a series of internal operations according to the thread migration instruction received by the microcode engine (416). The thread migration instruction may be interpreted by the microcode engine (416) as applying to a range of register entries or all register entries in one slice of the multi-slice processor. Further, the thread migration instruction may be interpreted by the microcode engine (416) as applying to entries in the general purpose registry or entries in the vector registry.

For example, thread migration instruction may be interpreted by the microcode engine (416) as an instruction to move all entries in the vector registry. In response, the microcode engine (416) generates one internal move operation for each entry in the vector registry.

Moving (504), responsive to each of the plurality of internal operations, data stored in a corresponding one of the plurality of register entries may be carried out by transferring the data from a register entry to another location, including another registry entry.

Figure 6:
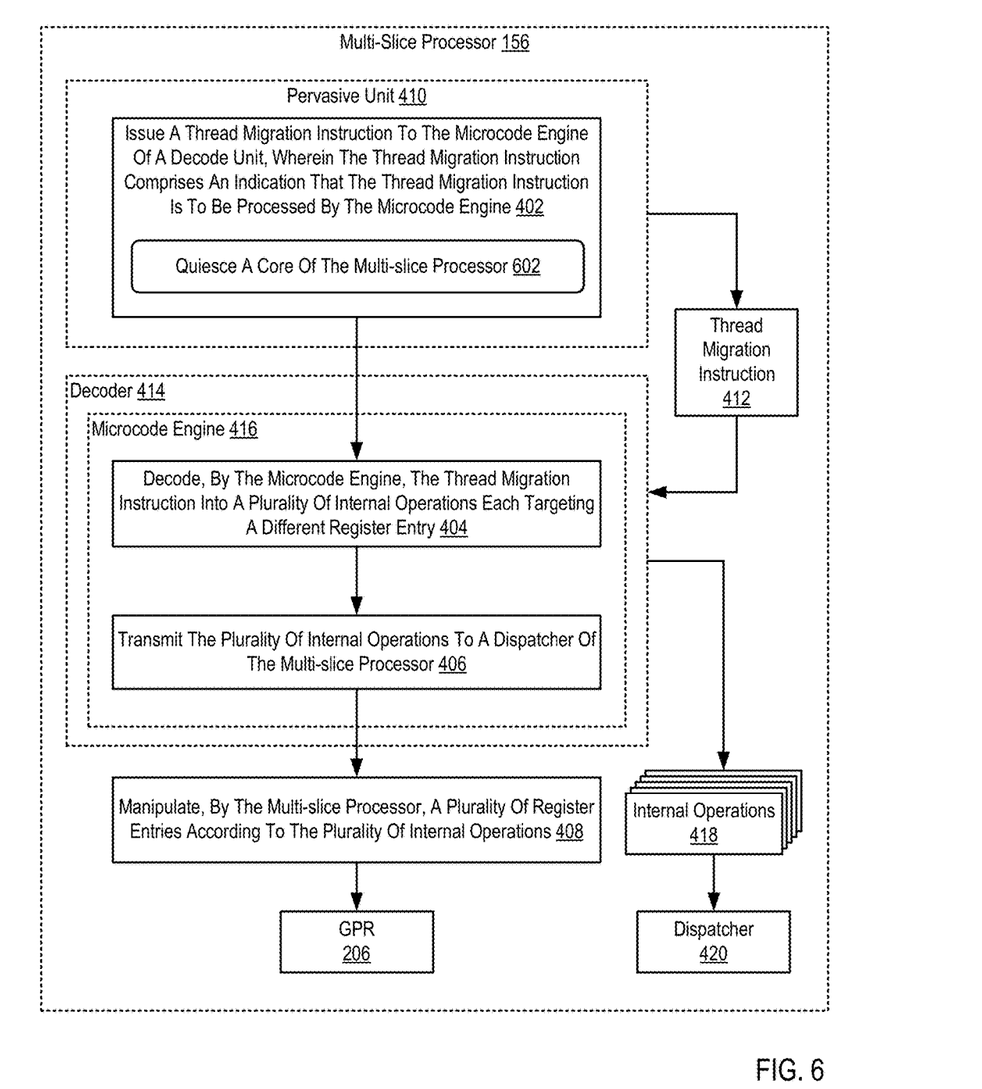
FIG. 6 sets forth a flow chart illustrating another example method of thread migration using a microcode engine of a multi-slice processor.

For further explanation, FIG. 6 sets forth a flow chart illustrating a further exemplary method for thread migration using a microcode engine of a multi-slice processor according to embodiments of the present invention that includes issuing (402) a thread migration instruction to the microcode engine (416) of a decode unit, wherein the thread migration instruction comprises an indication that the thread migration instruction is to be processed by the microcode engine (416); decoding (404), by the microcode engine (416), the thread migration instruction into a plurality of internal operations each targeting a different register entry; transmitting (406) the plurality of internal operations to a dispatcher of the multi-slice processor; and manipulating (408), by the multi-slice processor, a plurality of register entries according to the plurality of internal operations.

The method of FIG. 6 differs from the method of FIG. 4, however, in that in the issuing (402) a thread migration instruction to the microcode engine of a decode unit of FIG. 6 includes quiescing (602) a core of the multi-slice processor. Quiescing (602) a core of the multi-slice processor may be carried out by placing the core in a state in which execution of the thread associated with the instruction has ceased. For example, quiescing (602) the core may include stopping the execution of the thread, ceasing the instructions associated with the thread, emptying the instruction buffer, and ceasing instruction fetching.

Figure 7:
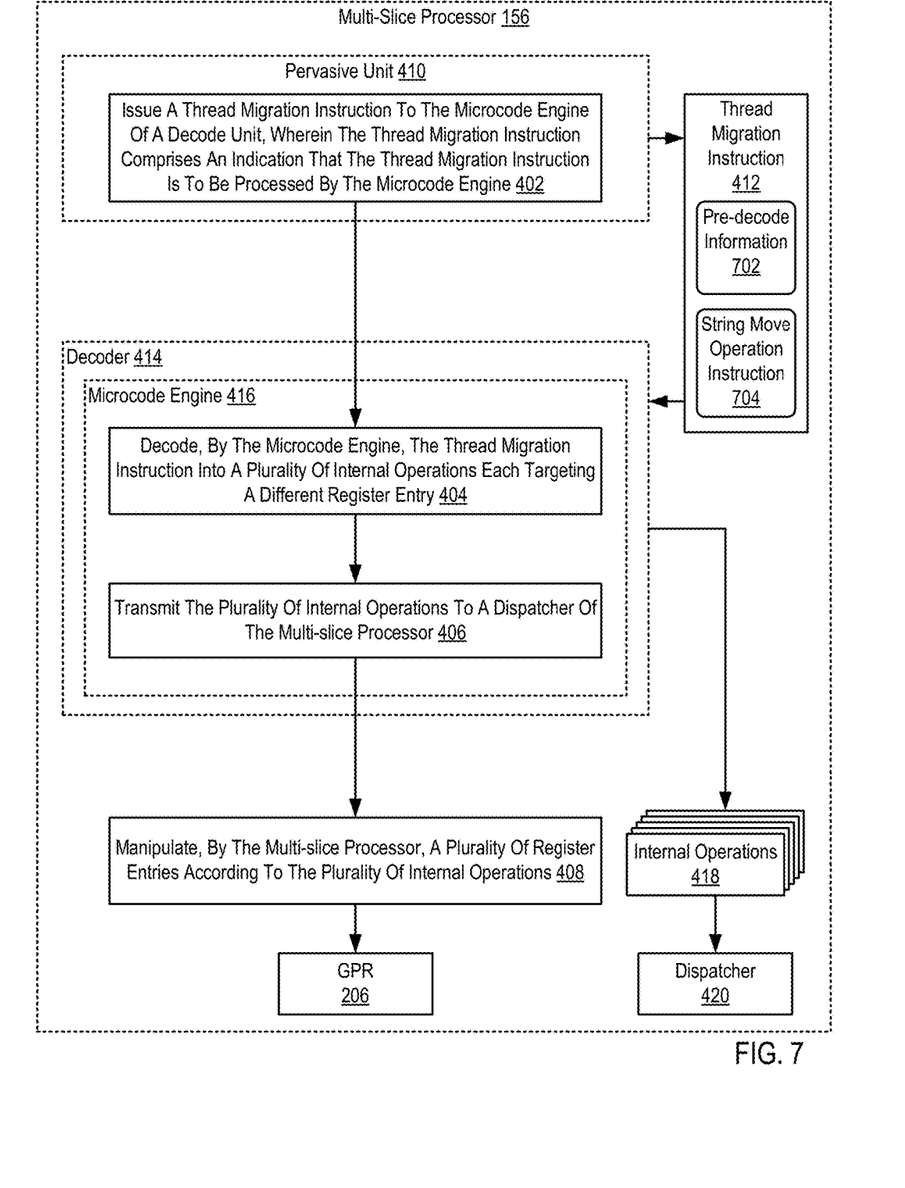
FIG. 7 sets forth a flow chart illustrating another example method of thread migration using a microcode engine of a multi-slice processor.

For further explanation, FIG. 7 sets forth a flow chart illustrating a further exemplary method for thread migration using a microcode engine of a multi-slice processor according to embodiments of the present invention that includes issuing (402) a thread migration instruction to the microcode engine (416) of a decode unit, wherein the thread migration instruction comprises an indication that the thread migration instruction is to be processed by the microcode engine (416); decoding (404), by the microcode engine (416), the thread migration instruction into a plurality of internal operations each targeting a different register entry; transmitting (406) the plurality of internal operations to a dispatcher of the multi-slice processor; and manipulating (408), by the multi-slice processor, a plurality of register entries according to the plurality of internal operations.

The method of FIG. 7 differs from the method of FIG. 4, however, in that in the method of FIG. 7 includes a thread migration instruction (412) that includes pre-decode information (702) and a string move operation instruction (704). Pre-decode information (702) may be a portion of the thread migration instruction that is directed to a pre-decode unit. The pre-decode information (702) may instruct the pre-decode unit that the thread migration instruction is to be decoded by the microcode engine (416). The pre-decode information (702) may, for example, be an additional set of bits (e.g., four bits) added to the thread migration instruction, which may have a length typical for processor instructions (e.g., 42 bits). The combination of the pre-decode information (702) and the thread migration instruction may be a length that exceeds the typical length for other processor instructions (e.g., a total of 48 bits).

A string move operation instruction (704) may be a thread migration instruction that instructs the multi-slice processor to move data stored in a set of register entries to another set of register entries. Specifically, the string move operation instruction (704) may include a start address of a source register entry, a start address of a target register entry, and a number of register entries to be moved. The string move operation instruction (704) may also include information about the data being moved, such as the number of bits in each register entry being moved. The thread migration instruction and/or the string move operation instruction (704) may be an instruction within the instruction set architecture of the multi-slice processor, such as a power performance computing instruction.

Exemplary embodiments of the present invention are described largely in the context of a fully functional computer system for thread migration using a microcode engine of a multi-slice processor. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of thread migration using a microcode engine of a multi-slice processor, the method comprising:

issuing a thread migration instruction to the microcode engine of a decode unit, wherein the thread migration instruction comprises a starting register entry and an ending register entry of a range of register entries to be manipulated and an indication that the thread migration instruction is to be processed by the microcode engine;

decoding, by the microcode engine, the thread migration instruction into a plurality of internal operations, wherein decoding the thread migration instruction into a plurality of internal operations comprises generating an internal operation for each register entry from the starting register entry to the ending register entry in the range of register entries presented in the thread migration instruction;

transmitting the plurality of internal operations to a dispatcher of the multi-slice processor; and manipulating, by the multi-slice processor, a plurality of register entries according to the plurality of internal operations.

2. The method of claim 1 wherein the thread migration instruction is decoded by the microcode engine as an all-register move instruction.

3. The method of claim 2 wherein manipulating the plurality of register entries according to the plurality of internal operations comprises moving, responsive to each of the plurality of internal operations, data stored in a corresponding one of the plurality of register entries.

4. The method of claim 1 wherein issuing the thread migration instruction to the microcode engine of the decode unit comprises quiescing a core of the multi-slice processor.

5. The method of claim 1 wherein the indication that the thread migration instruction is to be processed by the microcode engine comprises pre-decode information provided within the thread migration instruction, wherein the pre-decode information instructs a pre-decode unit that the thread migration instruction is to be decoded by the microcode engine.

6. The method of claim 1 wherein decoding, by the microcode engine, the thread migration instruction into the plurality of internal operations comprises decoding the thread migration instruction into at least 32 internal operations.

7. The method of claim 1 wherein the thread migration instruction comprises a string move operation instruction.

8. A multi-slice computer processor for thread migration using a microcode engine, the multi-slice computer processor configured for:

issuing a thread migration instruction to the microcode engine of a decode unit, wherein the thread migration instruction comprises a starting register entry and an ending register entry of a range of register entries to be manipulated and an indication that the thread migration instruction is to be processed by the microcode engine;

decoding, by the microcode engine, the thread migration instruction into a plurality of internal operations, wherein decoding the thread migration instruction into a plurality of internal operations comprises generating an internal operation for each register entry from the starting register entry to the ending register entry in the range of register entries presented in the thread migration instruction;

transmitting the plurality of internal operations to a dispatcher of the multi-slice processor; and manipulating, by the multi-slice processor, a plurality of register entries according to the plurality of internal operations.

9. The multi-slice computer processor of claim 8 wherein the thread migration instruction is decoded by the microcode engine as an all-register move instruction.

10. The multi-slice computer processor of claim 9 wherein manipulating the plurality of register entries according to the plurality of internal operations comprises moving, responsive to each of the plurality of internal operations, data stored in a corresponding one of the plurality of register entries.

11. The multi-slice computer processor of claim 8 wherein issuing the thread migration instruction to the microcode engine of the decode unit comprises quiescing a core of the multi-slice processor.

12. The multi-slice computer processor of claim 8 wherein the indication that the thread migration instruction is to be processed by the microcode engine comprises pre-decode information provided within the thread migration instruction, wherein the pre-decode information instructs a pre-decode unit that the thread migration instruction is to be decoded by the microcode engine.

13. The multi-slice computer processor of claim 8 wherein decoding, by the microcode engine, the thread migration instruction into the plurality of internal operations comprises decoding the thread migration instruction into at least 32 internal operations.

14. The multi-slice computer processor of claim 8 wherein the thread migration instruction comprises a string move operation instruction.

15. A computing system, the computing system including a multi-slice computer processor for thread migration using a microcode engine, the multi-slice computer processor configured for:

issuing a thread migration instruction to the microcode engine of a decode unit, wherein the thread migration instruction comprises a starting register entry and an ending register entry of a range of register entries to be manipulated and an indication that the thread migration instruction is to be processed by the microcode engine;

decoding, by the microcode engine, the thread migration instruction into a plurality of internal operations, wherein decoding the thread migration instruction into a plurality of internal operations comprises generating an internal operation for each register entry from the starting register entry to the ending register entry in the range of register entries presented in the thread migration instruction;

transmitting the plurality of internal operations to a dispatcher of the multi-slice processor; and manipulating, by the multi-slice processor, a plurality of register entries according to the plurality of internal operations.

16. The computing system of claim 15 wherein the thread migration instruction is decoded by the microcode engine as an all-register move instruction.

17. The computing system of claim 16 wherein manipulating the plurality of register entries according to the plurality of internal operations comprises moving, responsive to each of the plurality of internal operations, data stored in a corresponding one of the plurality of register entries.

18. The computing system of claim 15 wherein issuing the thread migration instruction to the microcode engine of the decode unit comprises quiescing a core of the multi-slice processor.

19. The computing system of claim 15 wherein the indication that the thread migration instruction is to be processed by the microcode engine comprises pre-decode information provided within the thread migration instruction, wherein the pre-decode information instructs a pre-decode unit that the thread migration instruction is to be decoded by the microcode engine.

20. The computing system of claim 15 wherein the thread migration instruction comprises a string move operation instruction.

\* \* \* \* \*